United States Patent [19]
Stephenson

[11] Patent Number: 6,075,950
[45] Date of Patent: Jun. 13, 2000

[54] ASSOCIATING A SOUND RECORD WITH A FILM IMAGE

[75] Inventor: Stanley W. Stephenson, Spencerport, N.Y.

[73] Assignee: Eastman Kodak Company, Rochester, N.Y.

[21] Appl. No.: 09/158,205

[22] Filed: Sep. 22, 1998

[51] Int. Cl.[7] .................................................. G03B 17/24
[52] U.S. Cl. ............................. 396/312; 396/429; 40/455
[58] Field of Search .................................... 396/312, 315, 396/319, 429; 434/308, 309, 311; 40/455

[56] References Cited

U.S. PATENT DOCUMENTS

| | | |
|---|---|---|
| 4,500,183 | 2/1985 | Tanikawa . |
| 4,905,029 | 2/1990 | Kelley . |
| 5,128,700 | 7/1992 | Inoue et al. . |
| 5,276,472 | 1/1994 | Bell et al. . |
| 5,313,235 | 5/1994 | Inoue et al. . |
| 5,387,955 | 2/1995 | Cocca . |
| 5,655,164 | 8/1997 | Tsai . |
| 5,774,752 | 6/1998 | Patton et al. . |

*Primary Examiner*—Howard B. Blankenship
*Attorney, Agent, or Firm*—Raymond L. Owens

[57] ABSTRACT

A method of associating a sound record with a film image, including capturing a film image on a recording medium and unique identifying information corresponding to such film image; recording the sound record and electrically transferring such sound record to a predetermined memory location corresponding to the unique identifying information; printing the unique identifying information on the film image; and retrieving the unique identifying information from the printed image and associating such unique identifying information with the recorded sound record.

3 Claims, 3 Drawing Sheets

ASSOCIATING A SOUND RECORD WITH A FILM IMAGE

FIELD OF THE INVENTION

The field of invention pertains to cameras with capability to record sounds and systems to play back recorded sound records in conjunction with associated photographic prints.

BACKGROUND OF THE INVENTION

Several methods have been proposed to associate a sound recording or record from a still camera with an image captured by the still camera. U.S. Pat. No. 4,905,029 discloses a camera having means to record sound associated with a captured image, to store the sound, play back the sound and record a digital representation of the sound onto either a separate data storage means or onto an instant print. The cited patent uses a removable memory element, a magnetic strip, to store the sound data. No means is disclosed to associate the sound recording with a given print in the case of a non-instant prints.

One solution to associating a sound record with a given print is found in U.S. Pat. No. 5,128,700. Data identification of a specific frame on the film is written optically onto the captured image. When a print is made from the negative image on the film strip, a visible code appears on the image. A visible code degrades the quality of the print image. A memory chip is removed from the camera and transferred to a storage unit. A print is placed in the storage unit, and the imprinted code is read, and the corresponding sound recording is played back. An alternative embodiment in that patent takes the information on the storage chip and records it onto a magnetic storage medium that is attached to the front or back of the print. The sound recording must be put onto a physical media, in this case a semiconductor memory chip, to transfer sound records to the storage unit.

Commonly-assigned U.S. Pat. No. 5,276,472 describes a sound capturing camera that writes a sound record onto a transparent magnetic coating on the film. This patent discloses transferring the sound record to the back of a print with an ink jet printer or thermally formed blisters or writing the sound record as a barcode on the an area adjacent to an image on the front of the print. The barcode on the front of the print can also carry a specific frame number. A hand held device is used on the print to read the sound record from the print and play back the sound record. This system requires writing the entire sound record on the print and in one case, proposes an unsightly pattern having bearing the sound record printed adjacent to the image on the print.

Commonly-assigned U.S. Pat. No. 5,774,752 discloses a method of transferring camera captured sound images through a photofinishing process to attach storage means containing the sound clips to printed images. This patent requires an elaborate process of transferring the sound clips through a photofinishing process to have a sound record attached to prints or index prints.

SUMMARY OF THE INVENTION

Accordingly, it is an object of the present invention to provide a method and apparatus that captures and replays a sound record associated with a photographic print that is unobtrusive and does not require transfer of a sound record to an index print.

The object is achieved in a method of associating a sound record with a film image, comprising the steps of:

(a) capturing a film image on a recording medium and unique identifying information corresponding to such film image;

(b) recording the sound record and electrically transferring such sound record to a predetermined memory location corresponding to the unique identifying information;

(c) printing the unique identifying information on the film image; and (d) retrieving the unique identifying information from the printed image and associating such unique identifying information with the recorded sound record.

The present invention captures a sound record in a still camera. The sound record is presented in association with a print of a captured scene. Sound record codes can be non-visible on the front of a print. The sound record can be transferred to a storage device without the need for a physical transfer media. The sound record can be kept out of the film photofinishing process. The large amount of data in a sound record does not have to be written on the print.

DETAILED DESCRIPTION OF THE INVENTION

Figure 1:
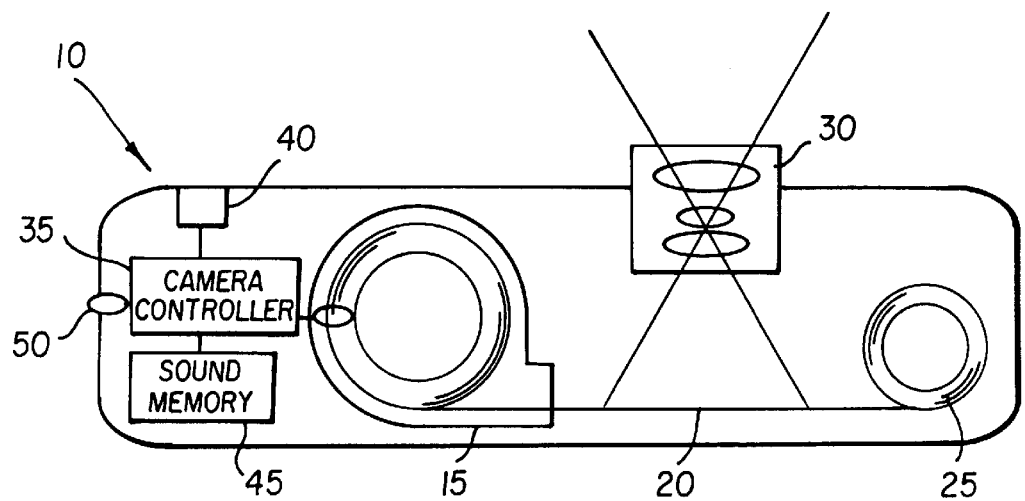
FIG. 1 is a top sectional view of a camera in accordance with the present invention.

FIG. 1 is a sectional views of a camera 10 in accordance with the present invention. Camera 10 supports a film cassette 15 storing film 20. Film cassette 15 and film 20 are built to the Advanced Photographic Standard (APS) specification. Film 20 can be thrust through the camera and taken up on film take-up 25. Film take-up 25 is driven by film take-up motor 27, which can also provide power to thrust film 20 from cassette 15. According to the APS specification, each film cassette 15 has a unique film code 70 that is encoded magnetically onto the leader of film 20. As film 20 is thrust from film cassette 15, film sensor 65 reads film code 70 from the leader of film 20. Film 20 supports a plurality of frames 22, each having a frame code 75. After an exposure, each frame 22 contains a film image. Frame code 75 is determined by film sensor 65 reading the magnetic encoding on each frame 22 as film 20 is advanced to successive frames 22, or by counting successive frames 22. The combination of film code 70 and frame code 75 provides a unique identifying information 105 of a specific frame 22.

Figure 2:
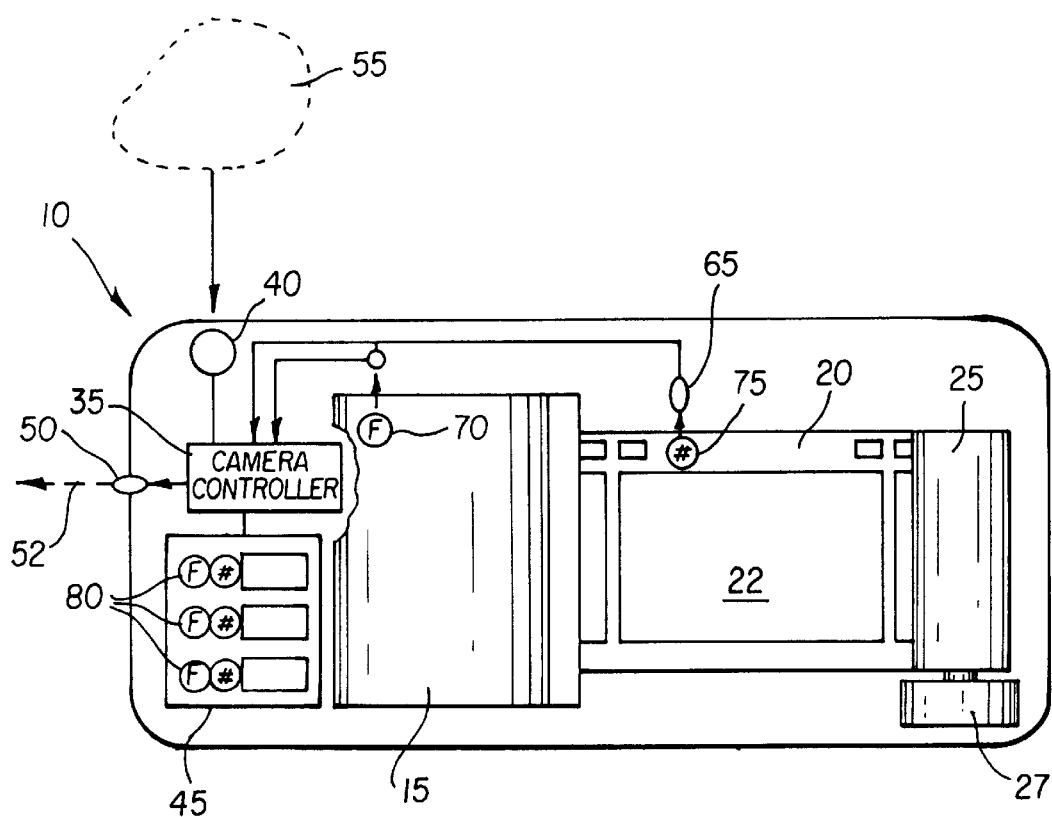
FIG. 2 is a back sectional view of the camera of FIG. 1.

Camera controller 35 operates on film take-up motor 27 to control the initial thrust, take-up and sequential advance of frames 22. Each frame 22 is exposed to capture a scene using conventional photographic optics 30. In FIG. 2, camera controller 35 captures digitized sound 55 using microphone 40 and stores digitized sound 55 in sound memory 45. Sound memory 45 electrically receives digitized sound 55 and unique identifying information 105 to form sound record 80. Sound memory 45 can be a 2 megabyte semiconductor memory that can store several minutes of sound broken into separate recording events, stored as sound records 80.

A camera data link 50 permits transmission of sound records 80 to external storage as data link communication 52. Camera data link 50 can be a modulated infrared radiation transmitter conforming to the industry standard known as IrDA. In an alternative embodiment, camera data link 50 can be a wired connection to an external data storage device. In either case, camera datalink 50 eliminates the need of removable data storage media to transfer sound records to a separate storage device.

Figure 3:
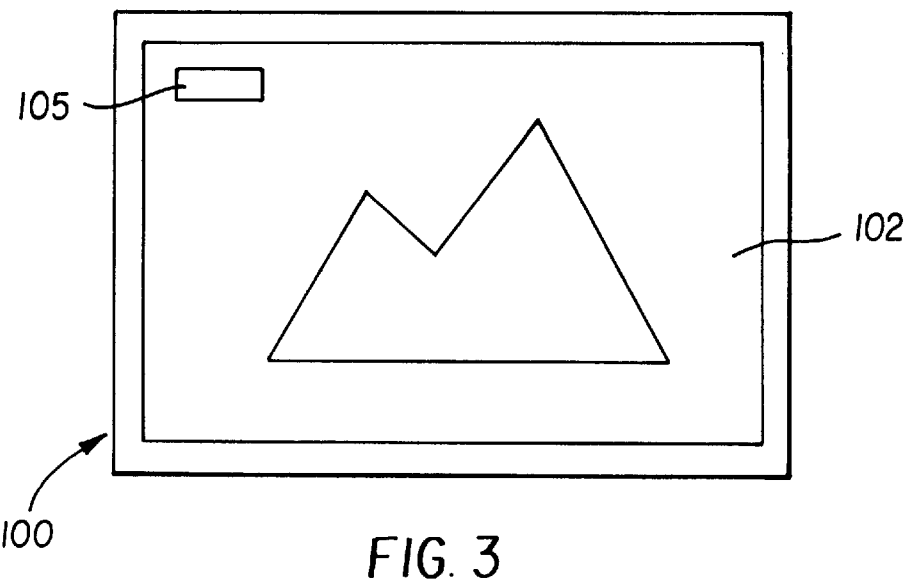
FIG. 3 is a front view of a print made in accordance with the present invention.

FIG. 3 shows a print 100 which has been made from a frame 22 on a film 20. The print 100 includes the film image 102 and the unique identifying information 105. Print 100 is created by a conventional APS printing process. According to the APS specification, each print must be marked with film code 70 and frame code 75 (the unique identifying information 105). Currently, the data is written using viewable dyes on the back of print 100. In the preferred embodiment, film code 70 and frame code 75 are combined and written as unique identifying information 105 which is written as a bar code on the front of print 100 using ultra violet inks so as to be non-visible to a viewer. The ink used can be Ultra Violet Ink 16-2330Q made by VideoJet Corporation of Elk Grove Village, Ill. Unique identifying information 105 can be applied to both the front and back of print 100. Unique identifying information 105 can be printed on the back of print 100 using dyes that are viewable in both visible and ultraviolet light.

Figure 4:
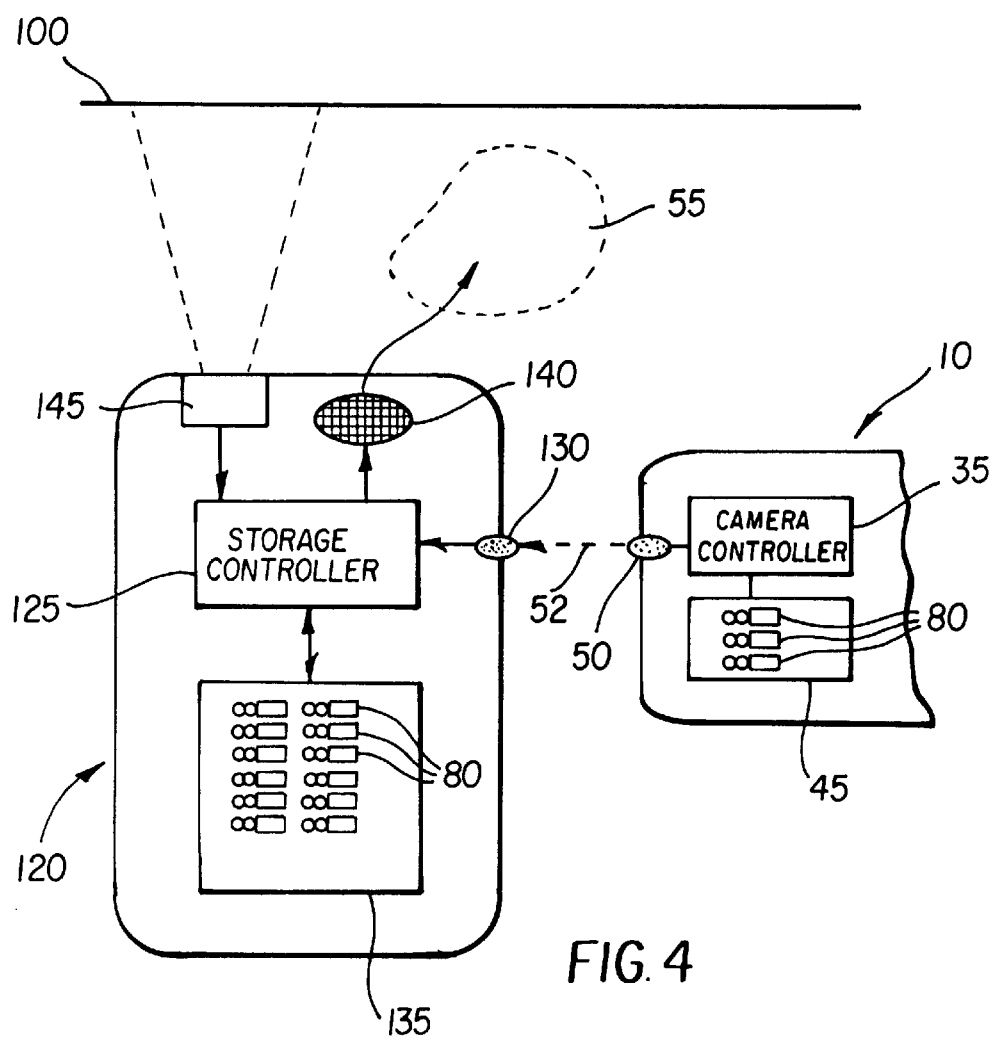
FIG. 4 is a top view of a camera, sound storage apparatus and print operating together in accordance with the present invention.

FIG. 4 shows sound storage apparatus 120 operating in conjunction with camera 10 and print 100. Sound storage apparatus 120 has a store data link 130 that receives sound records 80 sent from camera 10 through data link communication 52. Store data link 130 is a transceiver element that cooperates with camera data link 50 to transfer sound records 80 from sound memory 45 in camera 10 as data link communication 52. In the case that camera data link 50 is an IrDA transceiver, store data link 130 is a compatible IrDA transceiver. The use of IrDA transmission devices eliminates the need for a physical link to move sound records 80 from camera 10 to sound storage apparatus 120.

Alternatively, camera holding detail (not shown) in sound storage apparatus 120 can hold camera 10. Camera data link 50 and store data link 120 can be electrical contacts which are connected when camera 10 is rests in the camera holding detail. Data link communication 52 occurs through the connection of the electrical contacts that form camera data link 50 and store data link 130. This transfer method also eliminates the need a physical memory element to transfer sound records 80 from camera 10 to sound storage apparatus 120. A set of wires supporting serial or parallel data transfer can also be used to create data link communication 52. A hard-wired interconnect also does not need a physical memory element to transfer sound records 80 from camera 10 to sound storage apparatus 120.

Storage controller 125 receives sound records 80 and saves them in store memory 135. Store memory 135 can be a 1 gigabyte hard drive storing thousands of sound records 80. Sound storage apparatus 120 has a reader 145 that excites the surface of print 100 and reads or retrieves unique identifying information 105 having film code 70 and frame 75.

In the preferred embodiment, reader 145 has a momentary high intensity light source that floods unique identifying information 105 with ultraviolet light. A linear scanning unit in reader 145 is filtered to receive only ultraviolet radiation, and captures the information in unique identifying information 105. Alternatively, infrared absorbing inks can be used to write unique identifying information 105. The use of a non-visible ink on the front of the print 100 allows unique identifying information 105 to be on the image bearing surface of print 100 without creating image artifacts or requiring additional printing areas adjacent to the image.

Unique identifying information 105 from print 100 is associated with the film code 70 and frame code 75 of the film 20. Sound storage apparatus 120 needs only the film code 70 and frame code 75 in unique identifying information 105 to retrieve an associated sound record 80. Storing sound records 80 in sound storage apparatus 120 eliminates reading and writing large amounts of data associated with sound record 80 onto print 100. Writing a sound record 80 onto either film 20 and/or print 100 is timely and expensive. Writing only film code 70 and frame code 75 is simple and fast. Film code 70 and frame code 75 are already required to be placed on print 100, and placing that information non-visibly on the front of print 100 permits location of sound records 80 using only the front of print 100. In addition, the sound records 80 have been completely decoupled from the photofinishing process.

After sound storage apparatus 120 has read film code 70 and frame code 75 from unique identifying information 105, storage controller 125 searches store memory 135 to find a record labeled as coming from film code 70 and frame code 75. If one or more sound records 80 are found, the sound record(s) is/are played back by storage controller 125 using speaker 140 to reproduce digitized sound 55.

Figure 5:
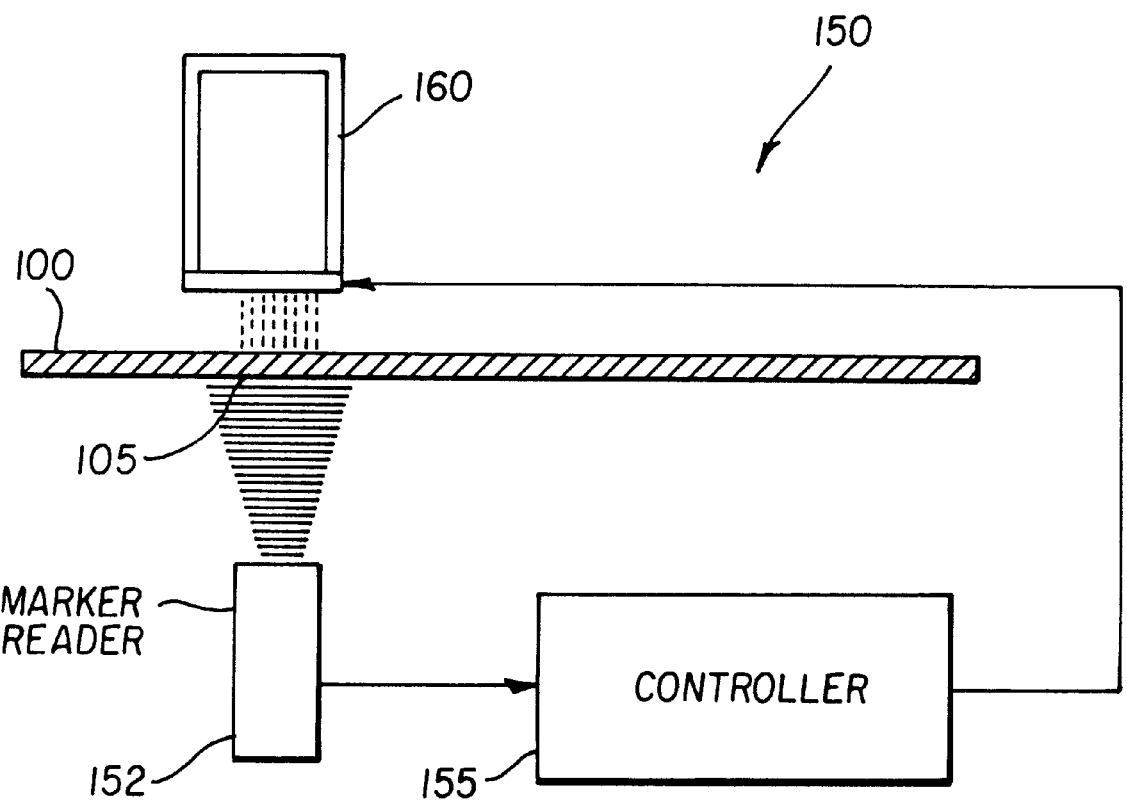
FIG. 5 is a front sectional view of a marking system in accordance with the present invention.

FIG. 5 is a front sectional drawing of a marker 150 for applying ultra violet dye to the front surface of a photographic print. A photofinishing process has kept track of the film code 70 and frame code 75 for each print 100. A previous printing step has applied unique identifying information 105 having film code 70 and frame code 75 to the back of print 100. Marker 150 has a conventional marker reader 152 that reads visible, unique identifying information 105 from the back of print 100. Marker controller 155 operates on the data read by marker reader 152 and drives an Excel 170iAF ink jet printer from VideoJet Corporation of Elk Grove Village, Ill. to print unique identifying code 105 in ultra violet ink onto the image bearing side of print 100. The print head 160 of the VideoJet printer is shown writing unique identifying information 105 in non-visible ink onto the front of print 100. Marker 150 has the advantage of being simple apparatus that is decoupled from the rest of the photofinishing process and applies non-visible, machine readable indices to the front of print 100. Alternatively unique identifying information 105 can be written by a print head 160 simultaneous with other photofinishing processes writing a visible unique identifying information 105 on the back of print 100.

The invention has been described in detail with particular reference to certain preferred embodiments thereof, but it will be understood that variations and modifications can be effected within the spirit and scope of the invention.

| PARTS LIST | |
| --- | --- |
| 10 | camera |
| 15 | film cassette |
| 20 | film |
| 22 | frame |
| 25 | film take-up |
| 27 | film take-up motor |
| 30 | optics |
| 35 | camera controller |
| 40 | microphone |
| 45 | sound memory |
| 50 | camera data link |

-continued

PARTS LIST

| | |
|---|---|
| 52 | data link communication |
| 55 | digitized sound |
| 65 | film sensor |
| 70 | film code |
| 75 | frame code |
| 80 | sound records |
| 100 | print |
| 102 | film image |
| 105 | unique identifying information |
| 120 | sound storage apparatus |
| 125 | storage controller |
| 130 | store data link |
| 135 | store memory |
| 140 | speaker |
| 145 | reader |
| 150 | marker |
| 152 | marker reader |
| 155 | marker controller |
| 160 | print head |

What is claimed is:

1. A sound storage and playback apparatus responsive to non-visible uniquely recorded information on a photographic print for associating recorded sound records corresponding to an image on the photographic print, comprising:

(a) means for receiving and storing sound records and unique identifying information corresponding to the image; and (b) means for retrieving the unique identifying information from the image of the photographic print and associating such unique identifying information with the recorded sound record, including radiation means for illuminating at least a portion of the image of the photographic print which has non-visible unique identifying information and means responsive to the reflected radiation and decoding such unique identifying information and associating it with a corresponding recorded sound record.

2. The invention of claim 1 further including a film camera for capturing the image on a photographic film disposed in a film cassette in the camera.

3. The invention of claim 2 further including means for providing electronic transfer of the sound record via a modulated radiation link.

* * * * *